(12) United States Patent
Ramanujan et al.

(10) Patent No.: US 7,995,475 B2
(45) Date of Patent: Aug. 9, 2011

(54) RELIABLE TRANSPORT PROTOCOL PROVIDING RECEIVER-BASED CONGESTION CONTROL

(75) Inventors: Ranga S. Ramanujan, Hamel, MN (US); Richard H. Carl, St. Bonifaciues, MN (US); Barry Trent, Chanhassen, MN (US); Edward Mandy, Victoria, MN (US); Clint Sanders, Eden Prairie, MN (US); Jordan C. Bonney, Bloomington, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 346 days.

(21) Appl. No.: 12/262,624

(22) Filed: Oct. 31, 2008

(65) Prior Publication Data

US 2010/0039937 A1 Feb. 18, 2010

Related U.S. Application Data

(60) Provisional application No. 61/001,269, filed on Oct. 31, 2007.

(51) Int. Cl.
*H04J 1/16* (2006.01)

(52) U.S. Cl. ....................................... 370/232
(58) Field of Classification Search .................. 370/232, 370/229, 233, 234, 235, 237, 236, 253, 282, 370/392, 394, 395.52, 466, 467; 709/223; 714/752
See application file for complete search history.

(56) References Cited

U.S. PATENT DOCUMENTS

| | | | |
|---|---|---|---|
| 6,981,194 B1 * | 12/2005 | Pass | 714/752 |
| 7,484,157 B2 * | 1/2009 | Park et al. | 714/748 |
| 7,809,818 B2 * | 10/2010 | Plamondon | 709/223 |

OTHER PUBLICATIONS

Ranga S. Ramanujan, Richard H. Carl, Barry Trent, Edward Mandy, Clint Sanders, and Jordan Bonney, "TCP-Tactical: A TCP-Compatible, Reliable Transport Protocol for Tactical Networks", pp. 1-4, distributed to DARPA customers May 25, 2007.
Kuzmanovic, "The Power of Explicit Congestion Notification", SIGCOMM '05, Aug. 21-26, 2005, pp. 1-12, Philadelphia, PA USA.
Ong et al., "An Introduction to the Stream Control Transmission Protocol (SCTP)", The Internet Society, pp. 1-10, May 2002.
Ramakrishnan et al., "The Addition of Explicit Congestion Notification (ECN) to IP", The Internet Society, pp. 1-63, Sep. 2001.

* cited by examiner

*Primary Examiner* — Chi H Pham
*Assistant Examiner* — Alexander Boakye
(74) *Attorney, Agent, or Firm* — Shumaker & Sieffert, P.A.

(57) ABSTRACT

The present application relates to an implementation of a reliable transport protocol that provides receiver-based congestion control within a computing system. An exemplary system includes a first network device and a second network device within a network. During a handshake procedure, a transmission rate at which data can be sent as well as an acceptable corruptive loss rate for a data path between the first network device and the second network device in the network is determined. The second network device then receives data sent from the first network device at the transmission rate. When the acceptable corruptive loss rate for received data has been exceeded, the second network device determines an amount by which to reduce the transmission rate, and then sends a notification to the first network device indicating the amount by which to reduce the transmission rate for subsequently transmitted data.

30 Claims, 8 Drawing Sheets

RELIABLE TRANSPORT PROTOCOL PROVIDING RECEIVER-BASED CONGESTION CONTROL

This application claims priority to Provisional Application No. 61/001,269, filed Oct. 31, 2007, which is hereby incorporated by reference in its entirety.

STATEMENT REGARDING FEDERALLY SPONSORED RESEARCH OR DEVELOPMENT

The United States Government may have certain rights in this application, which is based upon work supported by Defense Advanced Research Projects Agency (DARPA) under Space and Naval Warfare Systems Center, San Diego (SSC-SD) Contract No. N66001-05-C-8002.

Any opinions, findings, and conclusions or recommendations expressed in this application are those of the author(s) and do not necessarily reflect the views of DARPA or SSC-SD.

TECHNICAL FIELD

The present application relates to the implementation of a reliable transport protocol within a computing system.

BACKGROUND

The legacy transmission control protocol (TCP) relies upon sender-based congestion control, which presumes all losses are caused by congestion of a network, e.g. congestion at network routers. Some networks experience only congestion-based loss because of very "clean" communication links that are virtually lossless. TCP assumes that all packet loss is caused by congestion. Therefore, in accordance with TCP, network hosts will reduce transmission rates in response to any packet loss in order to combat the perceived (and perhaps non-existent) congestive packet loss.

A client computer and a server computer may exchange data in accordance with TCP. Each packet is marked with a packet sequence number. Each of the client and the server acknowledge reception of a new packet when the sequence number is one unit larger than the previous packet. However, a computer can detect a lost packet, e.g. due to congestion, when the packet arrives out of sequence, because the sequence number of a next packet will be two or more units larger than the most recently received in-sequence packet. That is, the lost packet will not arrive, so its sequence number will be skipped. In this case, the receiving computer will send a duplicate acknowledgement of the most recently received in-sequence packet. The transmitting computer, upon receiving a duplicate acknowledgement, will retransmit the lost packets and reduce its transmission rate to reduce the perceived congestion. In this manner, TCP may be considered a server-side congestion control protocol, because it is the "server," or transmitting computer, that determines that transmission rates must be reduced to avoid packet loss due to congestion.

Some networks, however, also experience corruptive loss. Networks operating over a radio transmission, for example, may regularly experience packet loss due to corruption of packets. In the face of corruptive loss (such as loss caused by underlying communication-link issues), network elements may still reduce transmission rates, in accordance with TCP. However, reducing the transmission rate will not correct the underlying problem of corruptive loss. Therefore the legacy TCP correction scheme of reducing transmission rate may lead to sub-optimal data-transfer rates.

Certain extensions to legacy TCP, such as explicit congestion notification (ECN), have been implemented to overcome this limitation of TCP. For example, in accordance with ECN, an intermediate network device may set flags in a packet IP header to indicate the existence of congestion at the intermediate network device. When the packet reaches its final destination, the destination computer may propagate the ECN flags back to the source of the packet and as a result the source may reduce its transmission rate. ECN, however, may not be feasible in environments where strict packet integrity is enforced by data-security mechanisms. Strict data-security mechanisms may prevent the ECN flags (or any in-transit packet markings) inserted by an intermediate network device, from reaching the destination computer as well as preventing propagation of the ECN flags back to the source.

Alternative reliable transport protocols, such as the Stream Control Transmission Protocol (SCTP), can transmit data over two network paths, but require recompilation of existing applications in order to make use of this feature for applications that bind to a specific IP address.

SUMMARY

The application herein relates to a transport layer protocol, referred to herein as TCP-Tactical, which is a reliable transport protocol that may use the Internet Protocol (IP) as a network-layer protocol. TCP-Tactical is "reliable" in the sense that it guarantees ordered delivery of a stream of packets. TCP-Tactical provides a novel congestion-control algorithm. In one embodiment, TCP-Tactical may be coupled with the ability to simultaneously stream data over two or more available network paths that exist between the source and destination computers. In this manner, load balancing of data transmission over multiple network paths may also be achieved. Computer operating systems that incorporate TCP-Tactical into their set of available transport protocols may help significantly increase application throughput.

In one embodiment, an implementation of a reliable transport protocol provides receiver-based congestion control within a computing system. An exemplary method includes the steps of determining, during a handshake procedure between a first network device and a second network device in a network, a transmission rate at which data can be sent as well as an acceptable corruptive loss rate for a data path between the first network device and the second network device, receiving, by the first network device, data sent from the second network device at the transmission rate across the data path, and determining an actual loss rate for the received data across the data path. The method may further include the steps of, when the actual loss rate exceeds the acceptable corruptive loss rate for received data, determining, with the first network device, an amount by which to reduce the transmission rate, and sending, with the first network device, a notification to the second network device indicating the amount by which to reduce the transmission rate for subsequently transmitted data.

In one embodiment, a method includes the steps of determining, during a handshake procedure, a transmission rate at which data can be sent as well as an acceptable corruptive loss rate for a data path between a first network device and a second network device in a network and transmitting data from the second network device to the first network device across the data path at the transmission rate. The method may further include steps of receiving, with the second network device from the first network device, a notification indicating that the acceptable corruptive loss rate for transmitted data has been exceeded, the notification further indicating an amount by which to reduce the transmission rate for subsequently transmitted data, reducing the transmission rate according to the amount indicated in the notification, and transmitting data from the second network device to the first network device at the reduced transmission rate.

In one embodiment, a computer-readable medium contains instructions. The computer-readable medium may be a computer-readable storage medium. Upon execution, the instructions may cause a programmable processor to determine, during a handshake procedure between a first network device and a second network device in a network, a transmission rate at which data can be sent as well as an acceptable corruptive loss rate for a data path between the first network device and the second network device, to receive, by the first network device, data sent from the second network device at the transmission rate across the data path, and to determine an actual loss rate for the received data across the data path.

In one embodiment, a computer-readable medium contains instructions that cause a programmable processor, upon executing the instructions, to determine, during a handshake procedure, a transmission rate at which data can be sent as well as an acceptable corruptive loss rate for a data path between a first network device and a second network device in a network, and to transmit data from the second network device to the first network device across the data path at the transmission rate.

In one embodiment, a network device includes a network interface, such as an Ethernet interface, and a module, which itself includes a handshake module to determine, during a handshake procedure, a transmission rate at which data can be sent as well as an acceptable corruptive loss rate for a data path between the network device and a second network device, and a transceiver module to receive data through the network interface, to determine an actual loss rate by comparing a number of packets actually received with a number of packets alleged to have been sent by the second network device over a defined period of time, and to send data at the transmission rate through the network interface. Additionally, the transceiver module may reduce the transmission rate by an amount indicated in a notification from the second network device that indicates that the acceptable corruptive loss rate for transmitted data has been exceeded. The module may be stored as instructions in a computer-readable medium, and a processor may execute the instructions. In one embodiment, the network device may further include a plurality of network interfaces, and the module may utilize a plurality of paths between the network device and the second network device to send and receive data.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
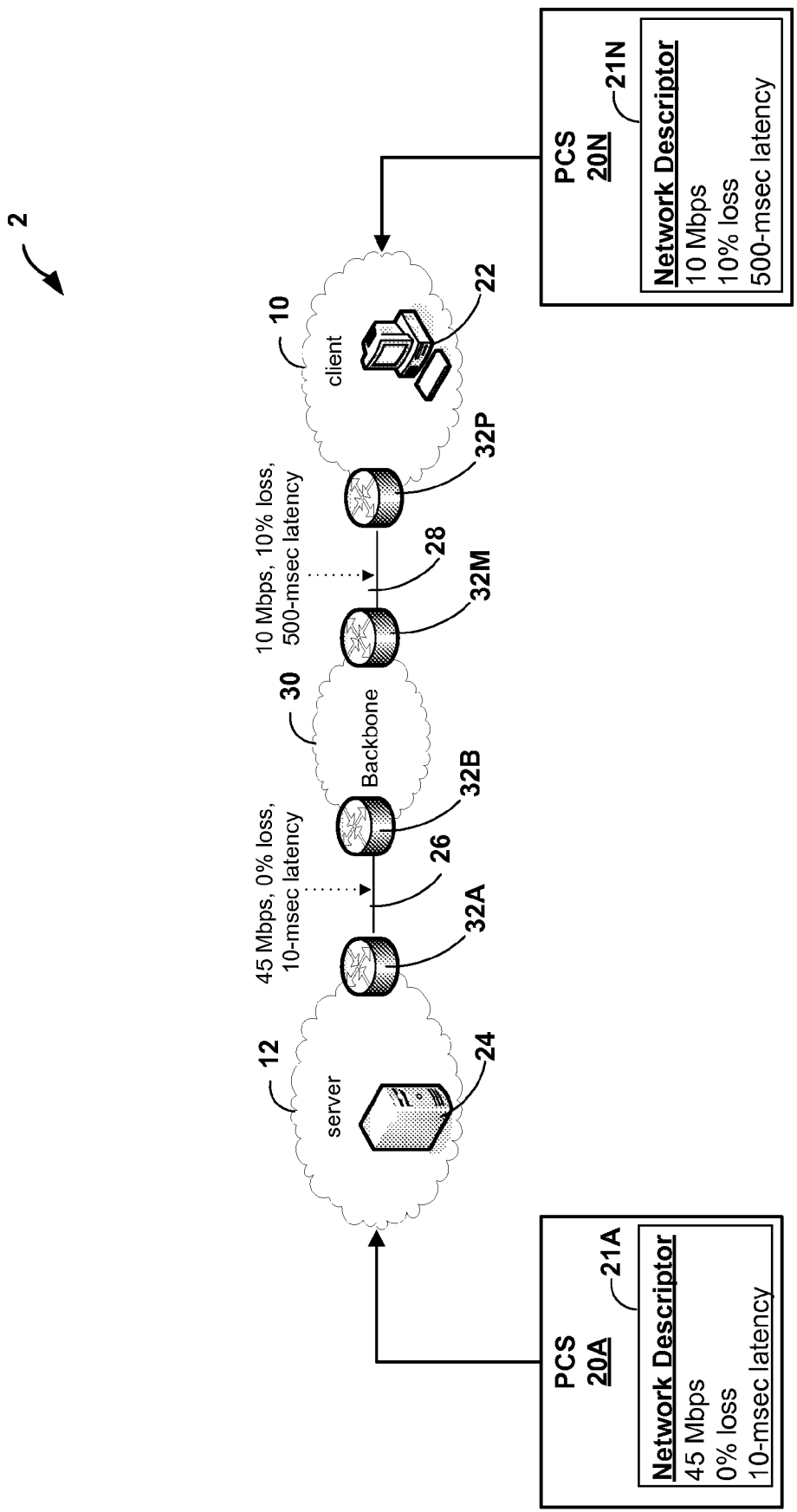
FIG. 1 is a conceptual diagram illustrating an exemplary embodiment of a system that includes a plurality of networks.

FIG. 1 is a conceptual diagram illustrating an exemplary embodiment of system 2 that includes a plurality of networks, i.e. network 10 and network 12. Each of networks 10 and 12 includes a distinct "network descriptor." In general, a network descriptor provides a description of details about the network, such as maximum transmission rate, normal or acceptable packet loss thresholds due to corruption, a latency, or other information about the network. In one embodiment, the network descriptor may provide an acceptable bit loss threshold, as opposed to an acceptable packet loss threshold. In the example of FIG. 1, network 10 includes Path Characterization Service (PCS) 20N, which provides network descriptor 21N. Network descriptor 21N indicates that network 10 has a maximum transmission rate, over network link 28, of 10 Mbps and an expected packet loss rate of 10%. The expected packet loss rate may be determined in accordance with the medium of network link 28. The expected packet loss rate may, in some embodiments, be considered an acceptable packet loss rate.

A network link may be any link between two routers, such as network link 28 between routers 32M and 32P in the example of FIG. 1. For example, network link 28 may be a satellite transmission, a radio transmission, or other medium in which packets may be commonly lost due to corruption. Network link 26 may also be any type of link between two routers, such as routers 32A and 32B. For example, network link 26 may be copper wire, fiber optic cable, or other network link media. It should be understood that network descriptors 21A and 21N of FIG. 1 are merely examples and that other values for acceptable packet loss, transmission rate, and other values may differ in other embodiments without limiting the scope of the techniques described herein. In one embodiment, a system administrator may configure network descriptor 21A of PCS 20A, and a different system administrator may configure network descriptor 21N. A packet loss rate may be considered "acceptable" in the sense that a party may determine that packets are lost over a corresponding medium at the loss rate as a result of packet corruption, and not as a result of network congestion, and that the back-off mechanisms of TCP should not be utilized in response to packets being lost to corruption, as described further herein.

In the example of FIG. 1, PCS 20N provides network descriptor 21N to client computing device 22 in network 10. Likewise, PCS 20A provides network descriptor 21A to server computing device 20 in network 12. With respect to the discussion herein, the term "server" generally refers to a computing device that provides particular data to a client, while the term "client" generally refers to a computing device that requests the particular data from the server. Therefore, one computing device may alternate roles of client and server during a single communication session. Therefore, the description herein of a "client" should not be understood to be limited to the computing device that initiates a communication session. Likewise, the description herein of a "server" should not be limited to the computing device that accepts a communication session.

Client computing device 22 may initiate a communication session with server computing device 24. Client computing device 22 may initiate the communication session in accordance with the methods described with respect to FIGS. 2A-2B. Client computing device 22 may initiate the communication session in accordance with a TCP-Tactical protocol, as discussed herein. In general, client computing device 22 may include an indicator, such as a bit flag or other indicator, in an initial packet sent to server computing device 24 that client computing device 22 is attempting to initiate a TCP-Tactical communication session, instead of a standard TCP communication session. Where server computing device 24 is configured in accordance with the TCP-Tactical protocol, server computing device 24 may acknowledge the use of the TCP-Tactical protocol by replying with a complementary bit flag or other indicator. Where server computing device 24 is not configured in accordance with the TCP-Tactical protocol, server computing device 24 may treat the initial packet from client computing device 22 as a standard TCP packet instead of as a TCP-Tactical packet.

In general, and as discussed further herein, TCP-Tactical may provide several advantages. For example, TCP-Tactical may tolerate a certain amount of packet loss due to packet corruption. Radio transmission of network packets, for example, may lose packets due to corruption. Acknowledging this, the TCP-Tactical protocol would not treat these lost packets as due to network congestion. In particular, server computing device 24 would not reduce its transmission rate when packets are lost due to corruption, in accordance with the TCP-Tactical protocol. Instead, client computing device 22 may determine whether packet loss is occurring due to congestion, or merely due to corruption. When client computing device 22 determines that packet loss is occurring due to congestion, instead of merely corruption, client computing device 22 may then instruct server computing device 24 to reduce its transmission rate.

TCP-Tactical Three-Way Handshake

Figure 2A:
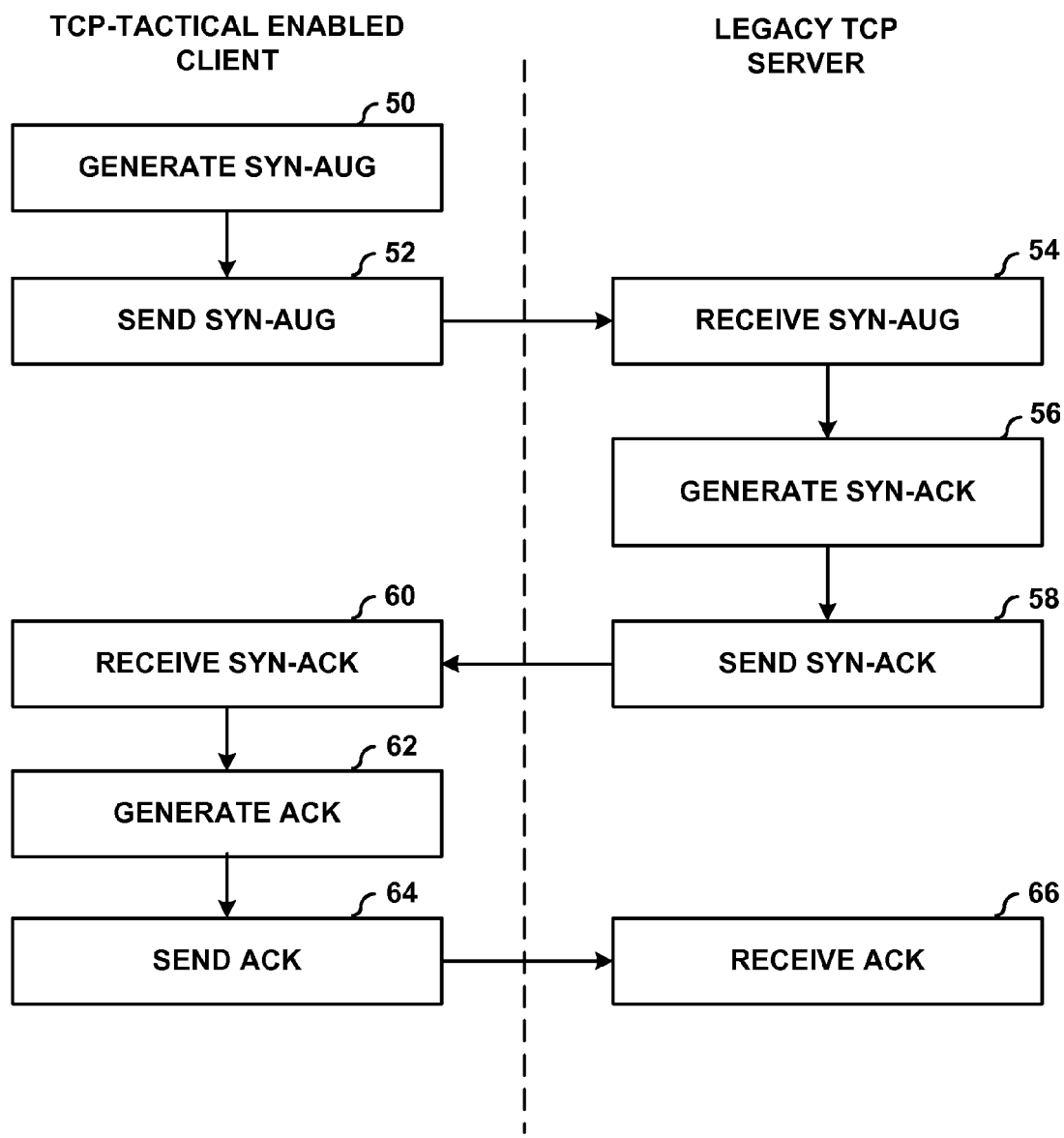
FIGS. 2A-2B are flowcharts illustrating exemplary three-way handshake routines that may be implemented within a network system, according to one embodiment.

FIG. 2A is a flowchart illustrating an exemplary three-way handshake that may be implemented within system 2 of FIG. 1, according to one embodiment. The method depicted in FIG. 2A assumes that client computing device 22 implements the TCP-Tactical protocol, as well as TCP, and that server computing device 24 does not implement the TCP-Tactical protocol, but does implement TCP. In this manner, client computing device 22 may be considered a "TCP-Tactical enabled client" and server computing device 24 can be considered a "legacy TCP server."

Initially, client computing device 22 may determine that a communication session with server computing device 24 is necessary. Client computing device 22 may, therefore, construct an augmented TCP synchronization packet (50). This packet is referred to herein as a SYN-AUG packet. In general, a SYN-AUG packet is very similar to a TCP synchronization (SYN) packet, but includes an additional indication that the sending device, i.e. client computing device 22, desires to establish a TCP-Tactical communication session. Client computing device 22 may construct the SYN-AUG packet such that a receiving device will treat the packet as a TCP-Tactical packet when the receiving device has implemented TCP-Tactical, but that the receiving device will treat the packet as a TCP packet when the receiving device has not implemented TCP-Tactical. Client computing device 22 may then send the SYN-AUG packet to server computing device 24 (52).

In the example of FIG. 2A, server computing device 24 has not implemented TCP-Tactical. Therefore, server computing device 24 may receive the SYN-AUG packet (54), but not understand the additional TCP-Tactical information. Therefore, server computing device 24 will treat the packet as a standard TCP synchronization packet, and accordingly server computing device 24 may generate a SYN-ACK (synchronization-acknowledgement) packet (56), as a standard server as known in the art would in response to a standard TCP SYN packet. From this point on, a standard TCP communication session may be established. That is, server computing device 24 will send the SYN-ACK packet (58). Client computing device 22 may then receive the SYN-ACK packet (60), generate an ACK packet (62), and send the ACK packet (64) to server computing device 24. Server computing device 24 may then receive the ACK packet (66), and a standard TCP three-way handshake will have occurred, other than the SYN-AUG packet initially sent by client computing device 22.

Figure 2B:
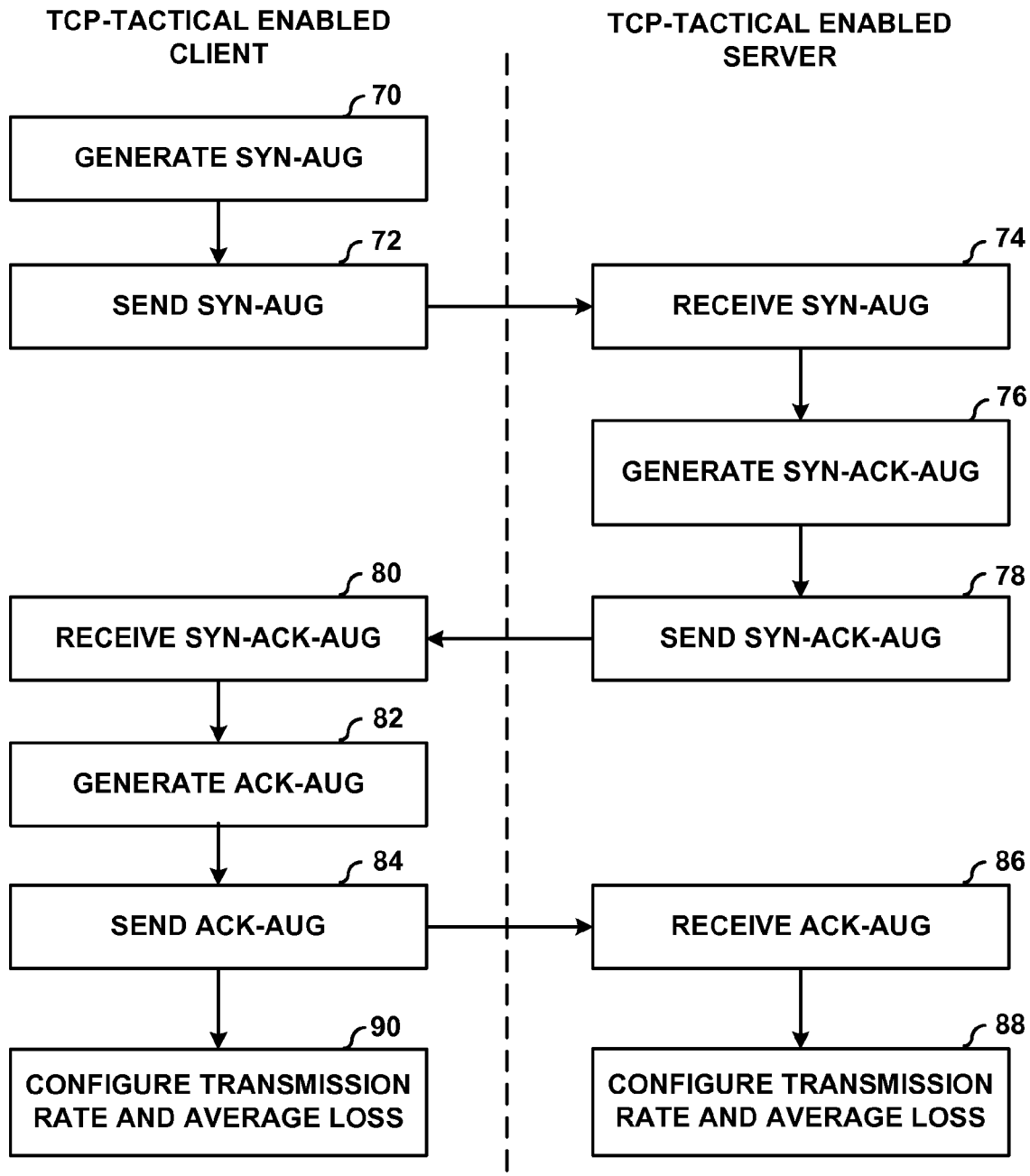

FIG. 2B is a flowchart illustrating another exemplary three-way handshake that may be implemented within system 2 of FIG. 1, according to one embodiment. The three-way handshake may be referred to herein as a "handshake procedure" for TCP-Tactical. Packets exchanged during the handshake procedure may be referred to herein as "handshake packets." For example, a SYN-AUG packet, a SYN-ACK-AUG packet, and an ACK-AUG packet may each be considered handshake packets. The method depicted in FIG. 2B assumes that client computing device 22 implements the TCP-Tactical protocol, as well as TCP, and that server computing device 24 also implements the TCP-Tactical protocol, as well as TCP. In this manner, client computing device 22 may be considered a "TCP-Tactical enabled client" and server computing device 24 can be considered a "TCP-Tactical enabled server." Initially, client computing device 22 may determine that a communication session with server computing device 24 is necessary. Client computing device 22 may, therefore, construct a SYN-AUG handshake packet (70) and send the SYN-AUG packet to server computing device 24 (72).

In this case, however, server computing device 24 may identify the SYN-AUG packet as an initialization of a TCP-Tactical communication session upon receiving the SYN-AUG packet (74). In response, server computing device 24 may generate a SYN-ACK-AUG handshake packet (76). The SYN-ACK-AUG packet may include network descriptor information. Server computing device 24 may retrieve network descriptor 21A from PCS 20A. Server computing device 24 may construct the SYN-ACK-AUG packet to include information from network descriptor 21A, such as a maximum transmission rate, an expected corruptive packet-loss rate, a latency, or other information about network 12. In one embodiment, server computing device 24 may regularly retrieve network descriptor 21A from PCS 20A. Server computing device 24 may also retrieve network descriptor 21A at other times and/or in other manners. Server computing device 24 may send the SYN-ACK-AUG packet to client computing device 22 (78).

Upon receiving the SYN-ACK-AUG packet from server computing device 24 (80), client computing device 22 may determine network descriptor 21N. Client computing device 22 may then determine communication session settings for the communication session with server computing device 24. For example, client computing device 22 may compare maximum transmission rates of network descriptor 21A and network descriptor 21N and select the lowest of the two maximum transmission rates as the maximum transmission rate for the communication session. As another example, client computing device 22 may compare expected loss rates of packets due to packet corruption from network descriptor 21A and network descriptor 21N and combine the two expected loss rates as the expected loss rate for the communication session. As another example, client computing device 22 may add the link latency values from network descriptor 21A and network descriptor 21N to derive the initial one-way latency for the communication session. In one embodiment, for server computing device 24 (S) and client computing device 22 (C), client computing device may determine:

Session_Loss_Rate=1−((1−S.loss_rate)*(1−C.loss_rate)); and

Max_Bandwidth=min(S.bandwidth, C.bandwidth); and

Max_Latency=(S.latency+C.latency);

Client computing device 22 may encode the determined communication session settings, such as the acceptable loss rate and the bandwidth, into a generated ACK-AUG handshake packet (82) and send the ACK-AUG packet to server computing device 24 (84). In one embodiment, client computing device 22 may calculate an expected latency time to determine a period for determining packet loss, e.g. in relationship to a round-trip time. Client computing device 22 may also establish the determined communication session settings as the communication session settings used for the communication session (90).

In one embodiment, an expected or acceptable loss rate may correspond to an expected or acceptable bit loss rate, rather than a packet loss rate. For example, determining an acceptable corruptive loss rate may be performed in terms of a number of bits or packets that are lost over a period of time. Where a bit-loss rate is specified, client computing device 22 may elect to reduce the packet size from the maximum transmission unit (MTU) of the corresponding network interface. For example, an Ethernet packet that is 1,518 bytes is 12,144 bits (1,518 bytes*8 bits/byte=12,144 bits). Any bit error rate greater than or equal to 1 in 12,144 (8.23E-5) effectively represents a 100% packet loss rate when 1,518-byte packets are transmitted over the loss link, e.g. link 28. However, by lowering the packet size to ¼ of the MTU (379 bytes or 3,032 bits), client computing device 22 may lower the packet loss rate to 25%.

After client computing device 22 sends the ACK-AUG, server computing device 24 may receive the ACK-AUG packet (86) and extract communication session settings determined by client computing device 22. The communication session settings may define a data path therein, i.e. a path between client computing device 22 and server computing device 24 that crosses both link 26 and link 28. In response, server computing device 24 may establish the determined communication session settings as the communication session settings used for the communication session (88). In this manner, client computing device 22 and server computing device 24 may establish a communication session in accordance with the TCP-Tactical protocol handshake procedure described herein.

Figure 3:
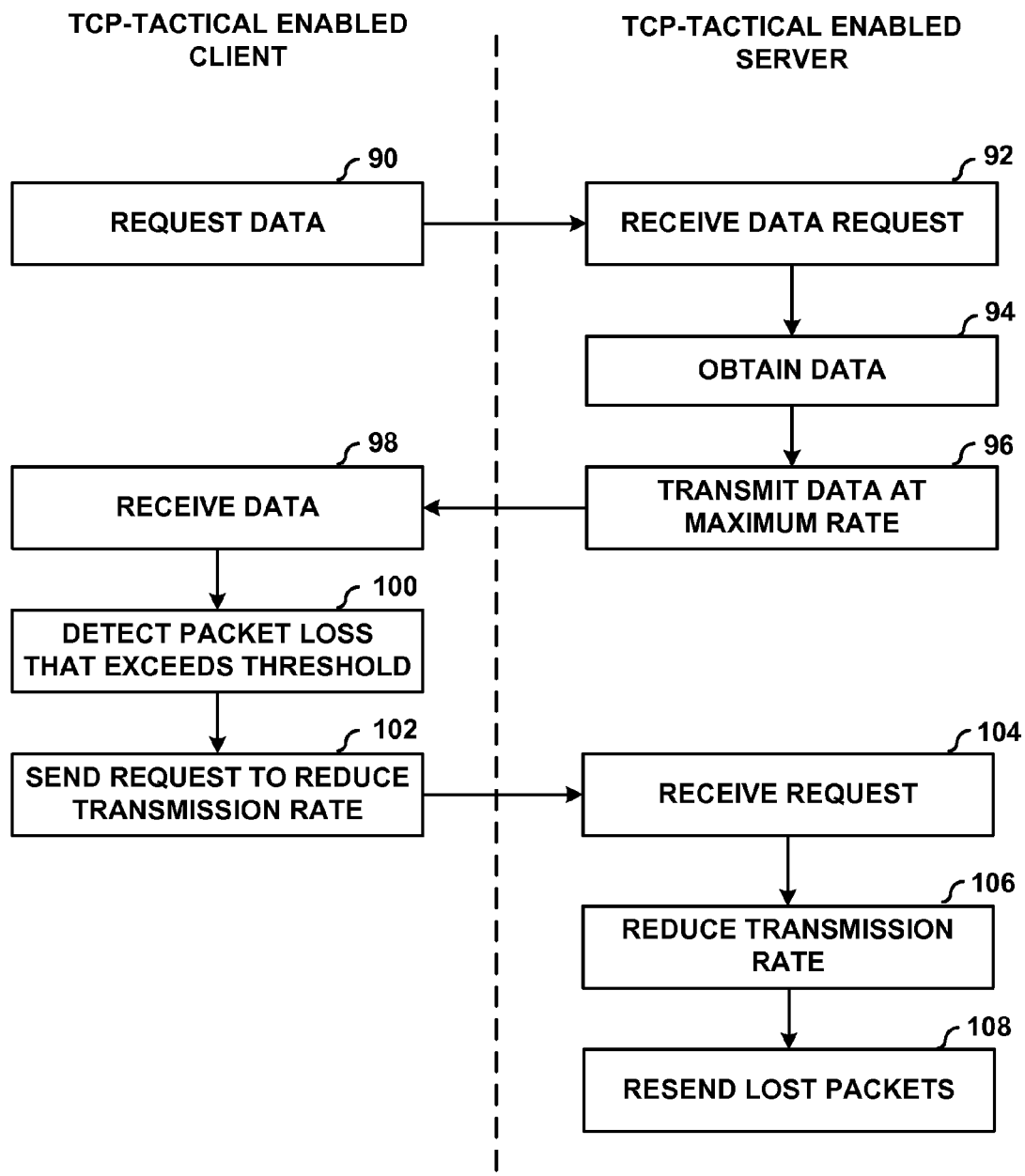
FIG. 3 is a flowchart illustrating an exemplary transmission of data between a client computing device and a server computing device.

FIG. 3 is a flowchart illustrating an exemplary transmission of data between client computing device 22 and server computing device 24. Initially, client device 22 and server device 24 may initiate a TCP-Tactical communication session, e.g. using the steps described with respect to FIG. 2B. After the TCP-Tactical three-way handshake has completed, each party to the communication session has configured a maximum transmission rate at which it can send data to the other side, in accordance with the determination by client computing device 22. Each party has also configured an acceptable corruptive loss rate that precludes premature invocation of the TCP-Tactical congestion-control algorithm, as described with respect to the exemplary method of FIG. 3.

Initially, client computing device 22, for example, may request certain data from server computing device 24 (90). That is, after completion of the three-way handshake, the parties to the communication session may begin transmitting data. Unlike legacy TCP, however, TCP-Tactical does not proceed through slow-start in a quest to ascertain available bandwidth; instead, TCP-Tactical immediately begins transmitting at the rate specified in the path descriptor that was contained in the final ACK-AUG. Accordingly, when server computing device 24 receives the request (92), server computing device may obtain the data (94) and transmit the data to client computing device 22 (96) at the maximum transmission rate that was predetermined during the three-way handshake, e.g. of FIG. 2B. In one embodiment, server computing device 24 may include an indication in the packet header of each packet that the packet is a TCP-Tactical packet, as opposed to a standard TCP packet.

As with TCP, TCP-Tactical utilizes cumulative acknowledgements. TCP-Tactical's cumulative acknowledgements are based on legacy TCP sequence numbers as well as an additional TCP-Tactical packet-count identifier (PCID). Therefore, when client computing device 22 receives packets in order (98), client computing device 22 may acknowledge the received packet with a sequence number of the last received packet (not shown). In one embodiment, the expected packet loss percentage configured in the three-way handshake of, e.g., FIG. 2B may be used as a threshold for packet loss. When a network device, such as server computing device 24, sends a series of packets, some of which are lost due either to corruption or to congestion, the PCID number of the last sent packet may be used to determine a number of packets that server computing device 24 alleges to have been sent.

Where, for example, client computing device 22 detects a packet loss that is at or below the threshold, client computing device 22 may simply ignore the packet loss and acknowledge the most recently received packet. On the other hand, where client computing device 22 detects packet loss that exceeds the threshold (100), client computing device 22 may generate and send a notification to server computing device 24 to reduce the transmission rate (102). The message may also include a duplicate acknowledgement of the last packet received before detecting the packet loss that exceeded the threshold.

Detected packet loss in excess of the expected packet loss, as configured in the three-way handshake of, e.g., FIG. 2B, may generally be attributed to network congestion as opposed to packet corruption caused by the link medium. In one embodiment, client computing device 22 may determine a packet loss percentage as a number of packets lost over a certain time period. Client computing device 22 may compare a number of packets actually received against a number of packets allegedly sent by server computing device 24 over the time period to determine a number of lost packets.

Server computing device 24 may receive the notification of a request to reduce the transmission rate (104). Accordingly, server computing device 24 may reduce the transmission rate (106). Server computing device 24 may also extract the sequence number of the last received packet and resend all packets following the packet with that sequence number at the reduced transmission rate (108). In one embodiment, server computing device 24 may go back to the maximum transmission rate at some point. For example, in one embodiment, server computing device 24 may increase the transmission rate after a certain period of time, such as after a time equivalent to a multiple of RTTs between client computing device 22 and server computing device 24. In one embodiment, for example, server computing device 24 may increase the transmission rate after 1.5 RTTs of not receiving a message from client computing device 22 to decrease the transmission rate.

As an example, assume, in one scenario, that a constant 50% (5 Mbps) of the available bandwidth (10 Mbps, in this example) between server computing device 24 and client computing device 22 is currently being consumed by other traffic. In this example, assume further that the determined expected loss rate for this communication session of packets lost due to corruption is 10%. That is, for every 10 packets burst at the maximum LAN transmission rate by the source, 5 are lost due to congestion, and there is an expectation that one of the 10 packets may be lost due to corruption. In this manner, when one of the packets is lost, TCP-Tactical determines that the one lost packet was lost due to corruption and that any other packets are lost due to network congestion. In the example, when the packet with send count of 10 reaches client computing device 22, 6 out of the 10 transmitted packets will have been lost (1 due to corruption, 5 due to congestion).

In general, client computing device 22 may determine total packet loss as the difference between the highest-numbered packet number received, minus the number of packets not received, divided by the number of packets expected to be received for the time period. Client computing device 22 may then determine packet loss due to congestion by subtracting the expected packet loss due to corruption from the determined total packet loss. In accordance with the example, client computing device 22 may calculate the current congestion as follows:

current loss=(10−4)/10=60% worst-case corruptive loss=10% overage (congestive-loss estimate)=60%−10%=50%

As a result, client computing device 22 may explicitly notify server computing device 24 to reduce its transmission rate by 50%. That is, client computing device 22 may generally send a notification to server computing device 24 to reduce its transmission rate by a factor in accordance with the determined packet loss due to congestion, specifically excluding packet loss due to corruption.

Upon receiving the congestion update from client computing device 22, server computing device 24 may reduce its transmission rate by 50% and retransmit the lost packets, awaiting updates from client computing device 22. If client computing device 22 sends another congestion update, server computing device 24 may again reduce its transmission rate by the amount specified by client computing device 22. If no further congestion update arrives within a specified time interval, server computing device 24 may enter a probing phase wherein the transmission rate is increased by a certain amount n, where n is a tunable TCP-Tactical parameter (in one embodiment, the default value for n may be 5%, but various other percentages may also be used). If no congestion update arrives at the source within a time t, the send rate may again be increased by n, and the process may be repeated until either client computing device 22 signals congestion or the maximum transmission rate specified at the negotiation of the three-way handshake is achieved. As a result, the back-off percentages specified by the congestion notifications from client computing device may decrease as server computing device 24 may fine-tune its transmission rate according to current path conditions.

TCP-Tactical may be further refined with an admission-control module that reduces transmission-rate spikes that occur when new flows are initiated. However, even with current transmission-rate spikes at flow initiation, TCP-Tactical may improve application-layer throughput, in one embodiment, by over an order of magnitude at 5-10% corruptive loss rates and 500-ms round-trip latencies.

Data Striping and Microflows

Figure 4:
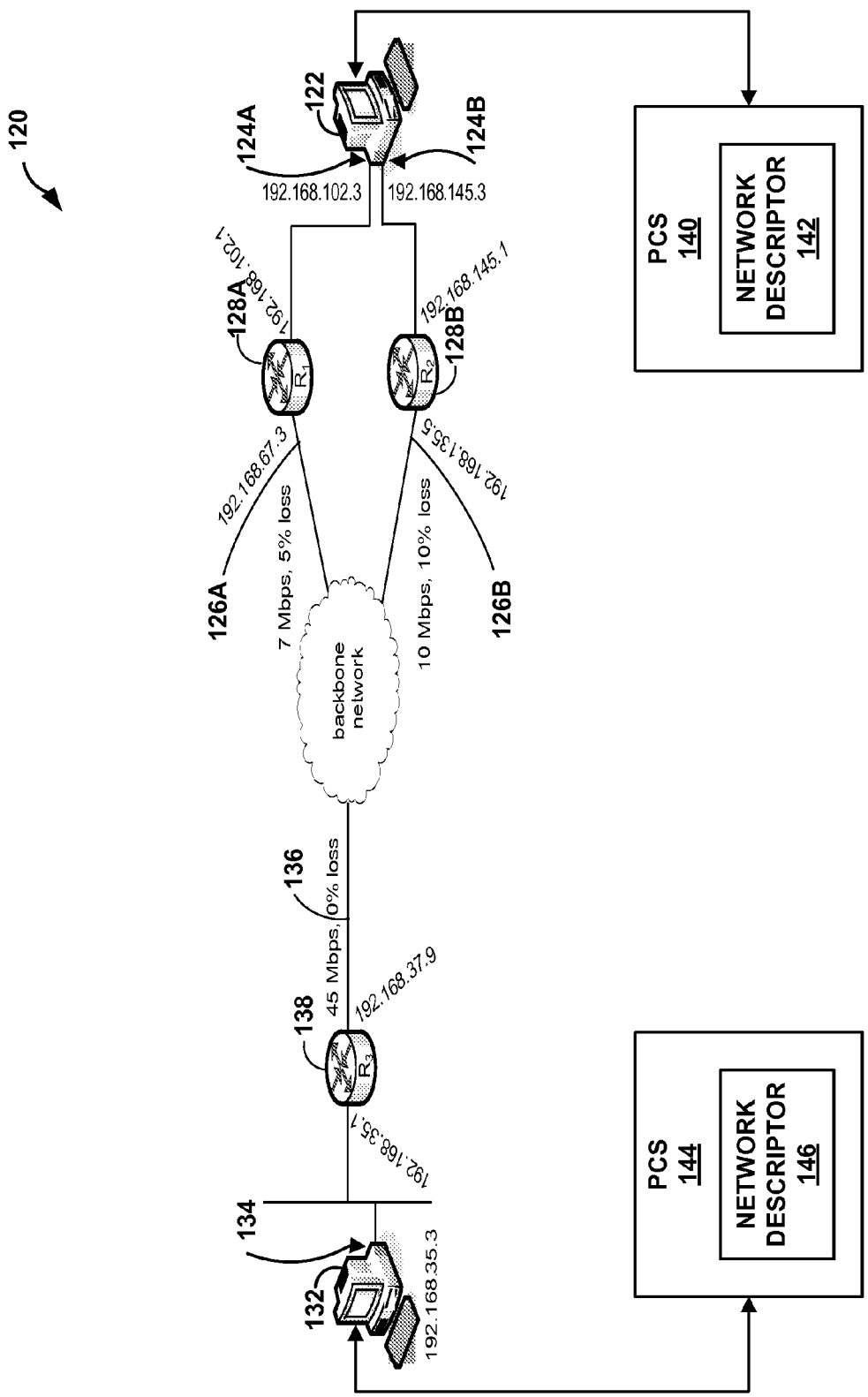
FIG. 4 is a conceptual diagram illustrating an exemplary embodiment of a system that is capable of implementing microflows.

FIG. 4 is a conceptual diagram illustrating an exemplary embodiment of system 120 that implements microflows. In the example of FIG. 4, multi-homed computing device 122 has two physical network interfaces 124 and two corresponding IP addresses; IP address 192.168.102.3 is associated with physical interface 124A and IP address 192.168.145.3 is associated with physical interface 124B. In another embodiment, IP address 192.168.102.3 and IP address 192.168.145.3 may each be associated with a single physical interface, e.g. physical interface 124A. In the example of FIG. 4, computing device 132 has a single address—192.168.35.3—that is associated with sole physical network interface 134 of computing device 132.

As referred to herein, a "multi-homed" computer is a computer with more than one IP address. While a plurality of IP addresses may be associated with a single physical network interface, and a plurality of physical network interfaces can be installed in a computer, a particular IP address can only be associated with one physical network interface, according to one embodiment. That is, IP addresses can be mapped many-to-one to physical interfaces, but IP addresses cannot be mapped one-to-many to physical interfaces. For example, a computer with physical network interfaces i and j cannot associate IP address w.x.y.z with both i and j concurrently, according to one embodiment.

Each IP address of a multi-homed computer directs traffic to a distinct router connected to the multi-homed computer. In the example of FIG. 4, computing device 122 directs traffic associated with network interface 124A, associated with IP address 192.168.102.3, to router 128A, which forwards traffic over link 126A, and computing device 122 directs traffic associated with network interface 124B, associated with IP address 192.168.145.3, to router 128B, which forwards traffic over link 126B. Moreover, PCS 140 may store network descriptor 142 that is associated with a network of a multi-homed computer, such as computing device 122. Network descriptor 142 may describe each link connected to the computing device. In the example of FIG. 4, network descriptor 142 includes characteristics of each of links 126A and 126B. In the example of FIG. 4, network descriptor 146, provided by PCS 144 that interacts with computing device 132, includes characteristics of link 136.

Software applications associate with a flow either through a connect system call made by the connection initiator or by an accept system call (by a process that is waiting for the incoming connection). A multi-homed TCP-Tactical computer, such as computing device 122, can decompose a single TCP flow (a "macroflow") into two or more microflows, with no additional intervention by the application. Microflows may differ from one another by their source and destination IP addresses, i.e., their source and destination TCP port numbers may remain the same as the macroflow.

In general, a computer, such as multi-homed computing device 122, may create a plurality of microflows by directing traffic over a plurality of links to different routers, such as links 126A and 126B and routers 128A and 128B. In one embodiment, multi-homed computing device 122 may divide a macroflow into two or more microflows for a communication session corresponding to a single software application executing on computing device 122. Computing device 122 may divide traffic between the microflows in any manner. For example, computing device 122 may use a microflow corresponding to the IP address for interface 124A for all even-numbered packets, and computing device 122 may use a microflow corresponding to the IP address for interface 124B for all odd-numbered packets. In another example, computing device 122 may divide traffic among microflows in proportion to the maximum bandwidth of each microflow. In another embodiment, computing device 122 may divide traffic among the microflows in a round-robin fashion.

Figure 5:
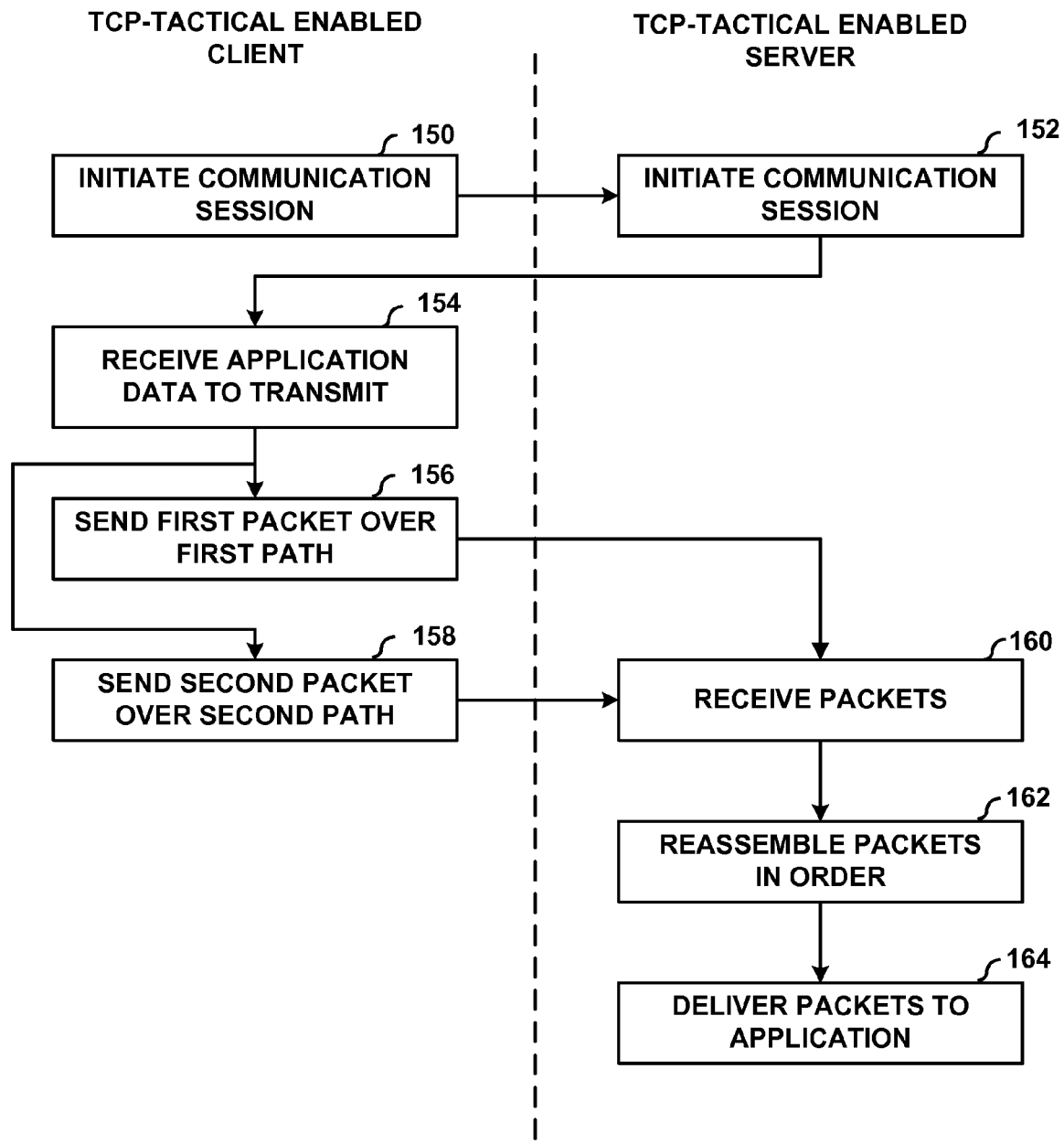
FIG. 5 is a flowchart that depicts an exemplary TCP-Tactical communication session that utilizes Internet protocol (IP) address information for forming microflows from a macroflow.

FIG. 5 is a flowchart that depicts an exemplary TCP-Tactical communication session that utilizes IP address information for forming microflows from a macroflow. The method of FIG. 5 is discussed with respect to exemplary system 120 of FIG. 4. However, it should be understood that the method of FIG. 5 may also apply to a system in which both communicating computing devices are multi-homed. In general, a multi-homed computer, such as computing device 122, may utilize a method similar to that described with respect to FIG. 2B in order to initiate a TCP-Tactical communication session with another computing device, such as computing device 132 (150, 152). In addition, however, two communicating parties, at least one of which is multi-homed, may use the additional steps of FIG. 5 to negotiate a plurality of microflows for a macroflow.

In addition to the steps described with respect to FIG. 2B, computing device 132, which may be considered the "server" for the purpose of this example, may include each IP address corresponding to computing device 132 in network descriptor 146 in the SYN-ACK-AUG packet that computing device 132 sends to computing device 122, which may be considered the "client" for the purpose of this example. Upon receiving the SYN-ACK-AUG packet from computing device 132, computing device 122 may examine the network descriptor from computing device 132 and compare it with network descriptor 142. Computing device 122 may also examine the received network descriptor to determine the number of available IP addresses corresponding to computing device 132. Computing device 122 may further compare the number of available IP addresses for computing device 132 to local IP addresses 124 corresponding to computing device 122.

Computing device 122 then may determine the number of ingress and egress links that are available at computing device 122 (in the example of FIG. 4, at IP addresses 192.168.102.3 and 192.168.145.3). Computing device 122 may further determine a number of ingress/egress links that are available to computing device 132, i.e. at IP address 192.168.35.3, in the example of FIG. 4. In the general case where there are n ingress/egress links for computing device 122 and m ingress/egress links for computing device 132, computing device 122 may determine all n*m paths after receiving the network descriptor from computing device 132. From the n*m possible paths, computing device 122 may determine a subset of data paths to use for transmitting data as microflows, as discussed herein.

In one embodiment, computing device 122 selects one of the available links of computing device 132 for each available link of computing device 122. In general, a network "path" is described as a connection between one of the IP addresses of the client and one of the IP addresses of the server. In one embodiment, computing device 122 may determine a number of paths equal to the number of IP addresses associated with computing device 122. That is, where computing device 122 has n ingress/egress links, computing device 122 may determine n data paths between computing device 122 and computing device 132. In the example of FIG. 4, computing device 122 may determine two data paths: one path between physical interface 124A and physical interface 134, and a second path between physical interface 124B and physical interface 134. In an alternative embodiment, computing device 122 may determine a number of paths equal to the minimum number of links of computing device 122 and computing device 132. That is, where computing device 122 has n links and computing device 132 has m links, computing device 122 may determine minimum(m, n) paths between computing device 122 and computing device 132.

Computing device 122 may associate a maximum bandwidth and corruptive-loss threshold with each derived path based on network descriptor 142 and the network descriptor 146, provided in computing device 132's SYN-ACK-AUG. In the example of FIG. 4, there may be a 7 Mbps bandwidth and 5% expected loss for link 126A and a 10 Mbps bandwidth and 10% loss for link 126B, each described by network descriptor 142. There may also be a 45 Mbps bandwidth and 0% loss for link 136, described by network descriptor 146. Accordingly, computing device 122 may determine that the <192.168.102.3, 192.168.35.3> path has a 7 Mbps maximum bandwidth and a 5% acceptable loss and that the <192.168.145.3, 192.168.35.3> path has a 10 Mbps maximum bandwidth and a 10% acceptable loss. Computing device 122 may send this determination as configuration data to computing device 132 in the final ACK-AUG. In this manner, computing device 122 and computing device 132 may initially negotiate a TCP-Tactical communication session that utilizes a plurality of microflows to accomplish a single macroflow.

The unmodified TCP application continues to transmit data to and receive data from the TCP-Tactical stack (through the standard socket interface) as if a single macroflow were still being used. Unbeknownst to the application, however, TCP-Tactical decomposes the macroflow into two microflows; these microflows are uniquely identified by the original TCP port numbers of the TCP-Tactical three-way handshake and the IP endpoint addresses of available paths determined by initiator of the connection. In the example presented in FIG. 5, the microflow IP address pairs are <192.168.102.3, 192.168.35.3> and <192.168.145.3, 192.168.35.3>.

As data for transmission is received from an application (154), TCP-Tactical stripes the transmit data over all available microflows by placing each successive packet to be transmitted in the next available microflow's output queue. In the example of FIG. 5, computing device 122 sends a first packet to computing device 132 over the first data path (156) and computing device 122 sends a second packet to computing device 132 over the second data path (158). In this fashion, microflows that are associated with a slower egress link may handle fewer packets over time than a higher-speed flow. TCP-Tactical congestion control (discussed previously with respect to, e.g., FIG. 3) may be performed independently on each microflow. In one embodiment, a PCS, such as PCS 140, may provide information to TCP-Tactical that indicates how packets are generally to be distributed across multiple network elements, such as routers, within the network. TCP-Tactical may then use this information to determine how to stripe transmit data over corresponding microflows.

Data received over multiple microflows (160) is reassembled into a single receive queue (162) to ensure ordered delivery prior to furnishing the received data to the application layer (through the standard sockets interface) (164). The reassembly process may utilize packet sequence numbering information provided by TCP-Tactical, as well as TCP packet sequence information, to reassemble data received over multiple microflows into the original macroflow. For example, the packets may be reassembled by placing the packets in order according to the TCP sequence numbers of the packets.

Figure 6:
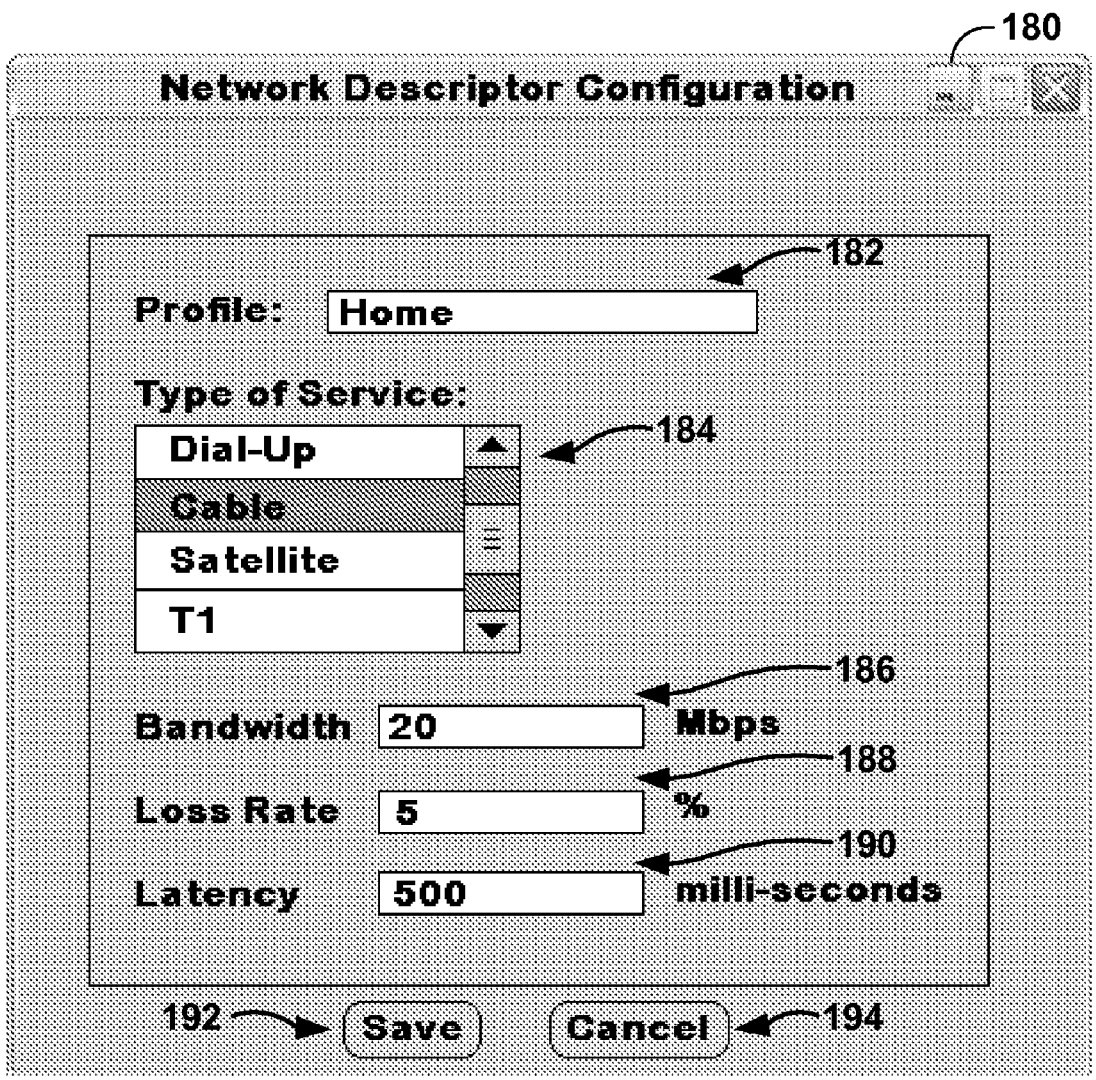
FIG. 6 is an exemplary screenshot of a graphical user interface that an administrator may use to create a network descriptor.

FIG. 6 is an exemplary screenshot of a graphical user interface (GUI) 180 that an administrator may use to create a network descriptor. A computing device, such as computing device 122 or computing device 22, may present GUI 180 to a user, such as an administrator. Alternatively, a PCS, such as PCS 140 or PCS 20N, may present GUI 180 to a user. Similarly, PCS 20A, PCS 144, computing device 24, or computing device 132 may present a GUI similar to GUI 180 to a user.

In any case, a user may interact with a computing device through GUI 180 to produce a network descriptor, such as network descriptor 142. A user may create a name for the network descriptor by entering text in name field 182. Upon selecting save button 192, a new network descriptor may be created and saved with a name corresponding to the text in name field 182 and with data corresponding to boxes 186, 188, and 190, as discussed later. If a network descriptor of a name corresponding to text in name field 182 already exists, the network descriptor may be overridden. Alternatively, if a user selects cancel button 194, any changes to the network descriptor may be cancelled.

A user may also select a type of service for the network descriptor using type of service selection box 184. Selection box 184 may include a number of standard Internet service provider types, such as "dial-up," "cable," "satellite," and "T1," as shown in FIG. 6. GUI 180 may retrieve a set of default values for bandwidth, loss rate, and latency when a user selects a type of service from selection box 184.

A user may customize values for, e.g., bandwidth, loss rate, and latency using bandwidth box 186, loss rate box 188, and latency box 190. A user may enter values in boxes 186, 188, and/or 190 to override a default value when a default value has been entered. For example, a user may enter a value for the maximum available bandwidth in bandwidth box 186, an expected loss rate in box 188, and an average latency in latency box 190.

Figure 7:
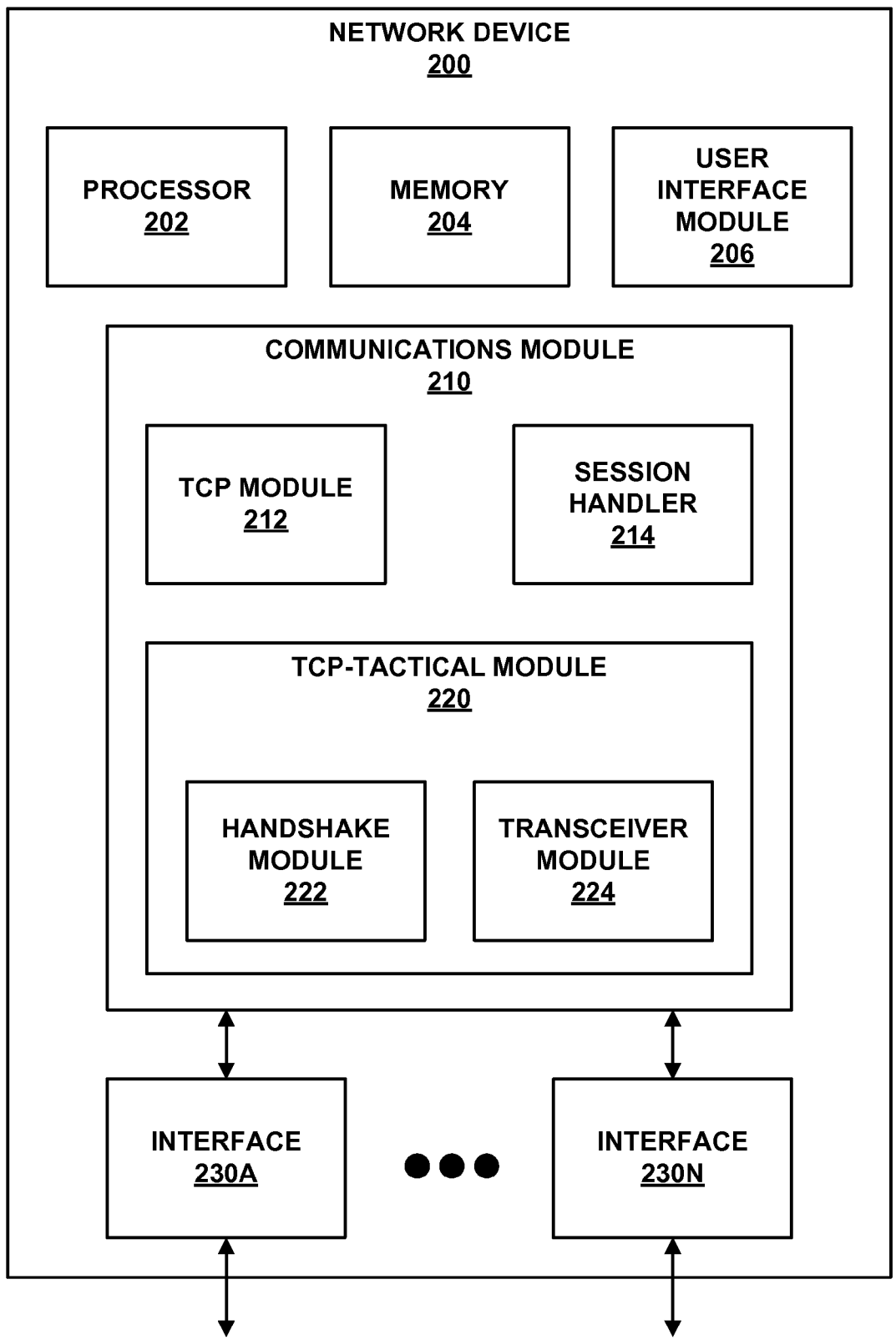
FIG. 7 is a block diagram illustrating an exemplary embodiment of a computing device that is TCP-Tactical enabled.

FIG. 7 is a block diagram illustrating an exemplary embodiment of network device 200 that is TCP-Tactical enabled. Network device 200 includes processor 202, memory 204, user interface module 206, communications module 210, and network interfaces 230A-230N (interfaces 230). In one embodiment, communications module 210 and/or user interface module 206 may be stored as instructions in memory 204. In another embodiment, communications module 210 and/or user interface module 206 may be hardware or firmware modules, such as one or more application specific integrated circuits (ASICs). Processor 202 may execute instructions to perform the functions of communications module 210 and/or user interface module 206. User interface module 206 may present a user interface, such as a command line interface or a graphical user interface (GUI), such as GUI 180 of FIG. 6.

In one embodiment, network device 200 may include only a single port, such as port 230A. In an alternative embodiment, network device 200 may include a plurality of network interfaces 230, as shown in FIG. 7. Communications module 210 may send and receive data over a computer network through network interfaces 230.

Communications module 210 may implement a plurality of various network protocols. In the example of FIG. 7, communications module 210 includes TCP module 212 and TCP-Tactical module 220. Communications module 210 may also include session handler 214, as shown in the example of FIG. 7. Session handler 214 may keep track of various communication sessions executing on network device 200 and data related thereto, as explained in greater detail below. In the exemplary embodiment, TCP module 212 is generally responsible for TCP communication sessions, while TCP Tactical module 220 is responsible for TCP-Tactical communication sessions.

In the exemplary embodiment, TCP-Tactical module 220 includes handshake module 222 and transceiver module 224. Handshake module 222 may perform an initial handshake when network device 200 initiates a communication session with another computing device over a network or when another computing device over a network initiates a communication session with network device 200. In one embodiment, handshake module 222 may utilize the methods described with respect to FIGS. 2A-2B in performing a handshake.

In general, when network device 200 is acting as a "server," i.e. when another computing device over a network requests a TCP-Tactical communication session with network device 200, handshake module 222 may perform the server side of TCP-Tactical. That is, handshake module 222 may retrieve a network descriptor from a PCS and send the network descriptor to the requesting computing device in a SYN-ACK-AUG packet. Upon receiving an ACK-AUG packet that includes a path descriptor, which may describe an acceptable corruptive loss rate for the session and a maximum transmission rate, handshake module 222 may establish the acceptable corruptive loss rate and the maximum transmission rate for the communication session and pass responsibility for the communication session to transceiver module 224. In one embodiment, handshake module 222 may store the acceptable corruptive loss rate and the maximum transmission rate, along with a session identifier (session ID), in session handler 214.

When network device 200 is acting as a "client," i.e. when network device 200 requests a TCP-Tactical communication session with another computing device over a network, handshake module 222 may perform the client side of TCP-Tactical. That is, handshake module 222 may form a TCP-Tactical SYN-AUG packet and send the SYN-AUG packet to the other computing device. If handshake module 222 receives a standard TCP SYN-ACK packet in response, handshake module 222 may hand off the communication session to TCP module 212, which may perform the method of FIG. 2A, in one embodiment. On the other hand, if handshake module 222 receives a TCP-Tactical SYN-ACK-AUG in response, handshake module 222 may extract a network descriptor from the SYN-ACK-AUG, retrieve its own network descriptor, compare the respective acceptable corruptive loss rates to determine the maximum acceptable corruptive loss rate, compare the respective maximum transmission rates to determine a minimum thereof, and form an ACK-AUG that includes a path descriptor, which in turn includes the maximum transmission rate for the communication session and an acceptable corruptive loss rate, and send the ACK-AUG to the other computing device. Handshake module 222 may also store the path descriptor for the communication session in session handler 214, along with a session ID corresponding to the communication session.

Whether network device 200 acts as a server or a client, once a TCP-Tactical session has been established, transceiver module 224 may send and receive data in accordance with the TCP-Tactical protocol, in the exemplary embodiment. In particular, transceiver module 224 may receive data from the other computing device and determine whether an actual amount of lost data is greater than the acceptable corruptive loss rate, for example, by comparing the number of received packets to a number of total packets expected to have been received for a certain time period. When the actual packet loss exceeds the acceptable corruptive loss rate, transceiver module 224 may send a message to the other computing device to reduce the transmission rate.

Similarly, transceiver module 224 may send data to the other computing device at the established transmission rate. Transceiver module 224 may further receive a message from the other computing device to reduce the transmission rate. Accordingly, transceiver module 224 may reduce the transmission rate in accordance with an amount indicated in the message. In one embodiment, transceiver module 224 may store data from the message in session handler 214, such as the reduced transmission rate and a time stamp. Moreover, after a certain period of time, transceiver module 224 may increase the transmission rate if transceiver module 224 has not received another message from the other computing device to reduce the transmission rate further. Transceiver module 224 may store the increased transmission rate in session handler 214, along with a new timestamp. Transceiver module 224 may continue to increase the transmission rate after each elapsed time period until the maximum transmission rate is reached or transceiver module 224 receives a message from the other computing device to reduce the transmission rate.

In addition, when network device 200 includes a plurality of interfaces 230, handshake module 222 and transceiver module 224 may support microflows using the plurality of ports. In one embodiment, TCP-Tactical module 220 may utilize a method similar to that described with respect to FIG. 5. For example, handshake module 222 may retrieve a network descriptor that describes a plurality of links, each of which may be associated with one of interfaces 230. In particular, the network descriptor may describe a maximum transmission rate and an acceptable corruptive loss rate for each of the links.

Handshake module 222 may also negotiate a plurality of paths (i.e., microflows) with the other computing device, which may also have a plurality of ports. As an example, handshake module 222 may receive a network descriptor from the other computing device that includes descriptions of a plurality of links. Handshake module 222 may then determine a number of paths, as well as a transmission rate and an acceptable corruptive loss rate, for each path.

Transceiver module 224 may then send and receive data over each of the paths as a plurality of microflows. In one embodiment, transceiver module 224 may regulate the transmission rate of each of the plurality of paths in accordance with the techniques described herein, e.g. by reducing or raising the transmission rate in response to a message received (or absence of such a message) from the other computing device that the acceptable corruptive loss rate has been exceeded. Similarly, transceiver module 224 may determine an actual loss rate for each of the plurality of microflows and compare the actual loss rate to the acceptable corruptive loss rate for each of the plurality of microflows. When an actual loss rate for one of the plurality of microflows exceeds the acceptable corruptive loss rate for that microflow, transceiver module 224 may determine an amount by which to reduce the transmission rate and send a message to the other computing device to reduce the transmission rate for data sent on the corresponding microflow.

In one or more exemplary embodiments, the functions and methods described above may be implemented in hardware, software, firmware, or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise random access memory (RAM), read only memory (ROM), electronically erasable programmable read only memory (EEPROM), CD-ROM or other optical disk storage, magnetic disk storage or other magnetic storage devices, flash memory, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and floppy disk. Combinations of the above should also be included within the scope of computer-readable media.

Various embodiments of the invention have been described. These and other embodiments are within the scope of the following claims.

The invention claimed is:

1. A method comprising:
   determining, during a handshake procedure between a first network device and a second network device in a network, a transmission rate at which data can be sent as well as an acceptable corruptive loss rate for a data path between the first network device and the second network device;
   receiving, by the first network device, data sent from the second network device at the transmission rate across the data path;
   determining an actual loss rate for the received data across the data path; and
   when the actual loss rate for the received data exceeds the acceptable corruptive loss rate, determining an amount by which to reduce the transmission rate and sending a notification from the first network device to the second network device indicating the amount by which to reduce the transmission rate for subsequently transmitted data.

2. The method of claim 1, wherein determining an amount by which to reduce the transmission rate comprises subtracting the acceptable corruptive loss rate from the actual loss rate.

3. The method of claim 1, wherein sending a notification comprises sending a notification indicating the amount by which to reduce the transmission rate, wherein the amount is a percentage that is equivalent to a difference between the acceptable corruptive loss rate and the actual loss rate.

4. The method of claim 1, wherein determining an actual loss rate comprises comparing a number of packets actually received by the first network device with a number of packets alleged to have been sent by the second network device over a defined period of time.

5. The method of claim 1, further comprising:
   transmitting data from the first network device to the second network device at the transmission rate;

receiving, by the first network device, a notification from the second network device indicating an amount by which to reduce the transmission rate;

reducing the transmission rate of the first network device in accordance with the notification; and transmitting data to the second network device at the reduced transmission rate.

6. The method of claim 5, further comprising:

after transmitting data from the first network device to the second network device at the reduced transmission rate, increasing the transmission rate a defined amount when the first network device does not subsequently receive a second notification from the second network device indicating a second amount by which to reduce the transmission rate after a period of time; and transmitting data from the first network device to the second network device at the increased transmission rate.

7. The method of claim 6, further comprising:

repeating the increasing of the transmission rate the defined amount after the period of time has elapsed again, until the increased transmission rate equals the transmission rate determined during the handshake procedure.

8. The method of claim 1, wherein determining, during a handshake procedure, an acceptable corruptive loss rate for a data path comprises:

sending, from the first network device to the second network device, a first handshake packet to request a data connection;

receiving, by the first network device, a second handshake packet from the second network device, the second handshake packet containing a network descriptor associated with the second network device;

identifying an acceptable corruptive loss rate for data transmission associated with the second network device using the received network descriptor associated with the second network device;

selecting the acceptable corruptive loss rate for data transmission across the path in accordance with the acceptable corruptive loss rate associated with the second network device and an acceptable corruptive loss rate associated with the first network device;

defining a path descriptor that includes the selected acceptable corruptive loss rate to be used by both the first network device and the second network device for data transmissions across the path; and sending a third handshake packet from the first network device to the second network device, the third handshake packet containing the defined path descriptor.

9. The method of claim 8, wherein selecting the acceptable corruptive loss rate comprises:

setting the acceptable corruptive loss rate for data transmissions across the path as the higher of the acceptable corruptive loss rate associated with the second network device and the acceptable corruptive loss rate associated with the first network device.

10. The method of claim 8, wherein the network descriptor further defines a maximum transmission rate for data transmission associated with the second network device, and wherein the method further comprises:

identifying a maximum transmission rate associated with the first network device; and wherein defining a path descriptor further comprises defining the path descriptor to include a transmission rate that is the lower of the maximum transmission rate associated with the first network device and the maximum transmission rate associated with the second network device.

11. The method of claim 8, wherein defining a path descriptor comprises:

defining a plurality of path descriptors, each of the plurality of path descriptors defining a path for information flow between the first network device and the second network device and an acceptable corruptive loss rate associated with the path.

12. The method of claim 11, further comprising:

determining that the plurality of different paths for information flow between the first network device and the second network device includes a number of paths equivalent to the higher of a number of ports on the first network device and a number of ports on the second network device.

13. The method of claim 11, further comprising:

receiving, by the first network device, data transmitted from the second network device across each of the plurality of different paths as separate microflows of data; and assembling data from each of the microflows into a macroflow by using sequence numbers associated with the data to put the data in order.

14. The method of claim 1, wherein determining, during a handshake procedure between a first network device and a second network device, an acceptable corruptive loss rate further comprises determining the acceptable corruptive loss rate in terms of a number of packets lost over a period of time.

15. The method of claim 1, wherein determining, during a handshake procedure between a first network device and a second network device, an acceptable corruptive loss rate further comprises determining the acceptable corruptive loss rate in terms of a number of bits lost over a period of time.

16. A method comprising:

determining, during a handshake procedure, a transmission rate at which data can be sent as well as an acceptable corruptive loss rate for a data path between a first network device and a second network device in a network;

transmitting data from the second network device to the first network device across the data path at the transmission rate;

receiving, with the second network device from the first network device, a notification indicating that the acceptable corruptive loss rate has been exceeded, the notification further indicating an amount by which to reduce the transmission rate; and reducing the transmission rate according to the amount indicated in the notification for subsequently transmitted data.

17. The method of claim 16, further comprising:

transmitting data from the second network device to the first network device at the reduced transmission rate.

18. The method of claim 17, further comprising:

after transmitting data from the second network device to the first network device at the reduced transmission rate, increasing the transmission rate a defined amount when the second network device does not subsequently receive a second notification from the first network device indicating a second amount by which to reduce the transmission rate after a period of time;

transmitting data from the second network device to the first network device at the increased transmission rate; and repeating the increasing of the transmission rate the defined amount after the period of time has elapsed again, until the increased transmission rate equals the transmission rate determined during the handshake procedure.

19. The method of claim 16, wherein transmitting data from the second network device to the first network device includes transmitting information identifying a number of packets of data sent from the second network device to the first network device.

20. The method of claim 19, wherein transmitting information identifying a number of packets comprises transmitting a sequence number with each of the packets.

21. The method of claim 19, wherein transmitting data comprises transmitting packets, wherein the notification indicates that an actual loss rate exceeds the acceptable corruptive loss rate for packet data received by the first network device, and wherein the actual loss rate is based on a comparison of a number of data packets received by the first network device with the number of data packets identified to have been sent from the second network device to the first network device over a defined period of time.

22. The method of claim 16, wherein determining, during a handshake procedure, a transmission rate and an acceptable corruptive loss rate for a data path comprises:
receiving, from the first network device by the second network device, a first handshake packet that requests a data connection;
obtaining a network descriptor associated with the second network device;
sending, to the first network device, a second handshake packet from the second network device, the second handshake packet containing the network descriptor associated with the second network device;
receiving a third handshake packet from the first network device with the second network device, the third handshake packet containing a path descriptor that defines an acceptable corruptive loss rate and a transmission rate;
setting the acceptable corruptive loss rate for the data path as the acceptable corruptive loss rate of the path descriptor; and
setting the transmission rate for the data path as the transmission rate of the path descriptor.

23. A non-transitory computer-readable medium comprising instructions for causing a programmable processor to:
determine, during a handshake procedure between a first network device and a second network device in a network, a transmission rate at which data can be sent as well as an acceptable corruptive loss rate for a data path between the first network device and the second network device;
receive, by the first network device, data sent from the second network device at the transmission rate across the data path;
determine an actual loss rate for the received data across the data path; and
when the actual loss rate for the received data exceeds the acceptable corruptive loss rate, determine an amount by which to reduce the transmission rate and send a notification from the first network device to the second network device indicating the amount by which to reduce the transmission rate for subsequently transmitted data.

24. A non-transitory computer-readable medium comprising instructions for causing a programmable processor to:
determine, during a handshake procedure, a transmission rate at which data can be sent as well as an acceptable corruptive loss rate for a data path between a first network device and a second network device in a network;
transmit data from the second network device to the first network device across the data path at the transmission rate;
receive, with the second network device from the first network device, a notification indicating that the acceptable corruptive loss rate has been exceeded, the notification further indicating an amount by which to reduce the transmission rate; and
reduce the transmission rate according to the amount indicated in the notification for subsequently transmitted data.

25. A network device comprising:
a network interface;
a processor; and
a module executable by the processor, the module comprising:
a handshake module executable by the processor to determine, during a handshake procedure between the network device and a second network device, a transmission rate at which data can be sent as well as an acceptable corruptive loss rate for a data path between the network device and the second network device; and
a transceiver module executable by the processor to receive data sent from the second network device at the transmission rate across the data path using the network interface, and to determine an actual loss rate for the received data across the data path by comparing a number of packets actually received with a number of packets alleged to have been sent by the second network device over a defined period of time,
wherein when the actual loss rate for the received data exceeds the acceptable corruptive loss rate, the transceiver module sends a notification to the second network device indicating an amount by which to reduce the transmission rate for subsequently transmitted data.

26. The network device of claim 25, further comprising:
a computer-readable medium to store the module as a set of executable instructions.

27. The network device of claim 25, further comprising a plurality of network interfaces, wherein:
the handshake module further determines a plurality of paths between the network device and the second network device, an acceptable corruptive loss rate for each of the plurality of paths, and a maximum transmission rate for each of the plurality of paths; and
the transceiver module receives data over each of the plurality of paths as a plurality of microflows, and reassembles microflow data received from the paths to form a macroflow in accordance with sequence numbers of packets of data received from the microflows.

28. The network device of claim 25, wherein the handshake module determines the acceptable corruptive loss rate in terms of a number of packets lost over a period of time.

29. The network device of claim 25, wherein the handshake module determines the acceptable corruptive loss rate in terms of a number of bits lost over a period of time.

30. A network device comprising:
a network interface;
a processor;

a handshake module executable by the processor to determine, during a handshake procedure between the network device and a second network device, a transmission rate at which data can be sent as well as an acceptable corruptive loss rate for a data path between the network device and the second network device; and a transceiver module executable by the processor to transmit data to the second network device across the data path at the transmission rate using the network interface, and to receive from the second network device a notification indicating that the acceptable corruptive loss rate has been exceeded, the notification further indicating an amount by which to reduce the transmission rate, and wherein the transceiver module reduces the transmission rate according to the amount indicated in the notification for subsequently transmitted data.

* * * * *